United States Patent
Wilkinson

(10) Patent No.: US 10,860,967 B2
(45) Date of Patent: Dec. 8, 2020

(54) PRODUCT DELIVERY CONTROL SYSTEMS AND METHODS

(71) Applicant: Walmart Apollo, LLC, Bentonville, AR (US)

(72) Inventor: Bruce W. Wilkinson, Rogers, AR (US)

(73) Assignee: Walmart Apollo, LLC, Bentonville, AR (US)

(*) Notice: Subject to any disclaimer, the term of this patent is extended or adjusted under 35 U.S.C. 154(b) by 811 days.

(21) Appl. No.: 15/184,321

(22) Filed: Jun. 16, 2016

(65) Prior Publication Data

US 2016/0371628 A1 Dec. 22, 2016

Related U.S. Application Data

(60) Provisional application No. 62/182,343, filed on Jun. 19, 2015.

(51) Int. Cl.
*G06Q 10/08* (2012.01)

(52) U.S. Cl.
CPC .................. *G06Q 10/083* (2013.01)

(58) Field of Classification Search
CPC .............. G06Q 10/0631; G06Q 10/08; G06Q 10/0833; G06Q 10/083; G06Q 20/123; G10H 2220/355; H04W 4/185; H04W 4/02; H04W 4/021; G05B 15/02; G05B 19/042;

(Continued)

(56) References Cited

U.S. PATENT DOCUMENTS

| | | | |
|---|---|---|---|
| 6,546,257 B1 * | 4/2003 | Stewart | H04W 4/02 340/988 |
| 8,694,282 B2 * | 4/2014 | Yuen | G06K 9/22 702/160 |
| 9,282,432 B1 * | 3/2016 | Chang | H04W 4/021 |

(Continued)

OTHER PUBLICATIONS

"Geo-Fence Technology in Delivery Operations," Office of Inspector General: United States Postal Service. Report No. DR-MA-14-006, pp. 1-12, Aug. 14, 2014. (Year: 2014).*

(Continued)

*Primary Examiner* — George Chen
*Assistant Examiner* — Brian Adams Heflin
(74) *Attorney, Agent, or Firm* — Fitch, Even, Tabin & Flannery LLP

(57) ABSTRACT

Methods, systems and apparatus are provided in controlling product deliveries to customers. Some embodiments provide a system, comprising: a delivery control system comprising: a delivery control circuit; and a memory coupled to the delivery control circuit and storing computer instructions that when executed by the delivery control circuit cause the delivery control circuit to: identify that a first customer has traveled beyond a first geo-location boundary associated with the first customer; trigger, in response to identifying that the first customer has traveled beyond the first geo-location boundary, a change in monitoring activity of movements of the first customer; identify that the first customer has traveled beyond a second geo-location boundary associated with the first customer; and automatically suspend the scheduled delivery of the one or more products to the delivery site in response to identifying that the first customer has traveled beyond the second geo-location boundary.

20 Claims, 3 Drawing Sheets

(58) Field of Classification Search
CPC .......... G05B 19/4183; G05B 19/41865; G06K 9/6215
USPC ...................................................... 705/330
See application file for complete search history.

(56) References Cited

U.S. PATENT DOCUMENTS

| | | | |
|---|---|---|---|
| 9,858,738 B2 | 1/2018 | Wilkinson | |
| 9,916,528 B2 | 3/2018 | Wilkinson | |
| 9,939,327 B2 | 4/2018 | Wilkinson | |
| 10,453,004 B2* | 10/2019 | Davidson | G06Q 10/08355 |
| 2006/0145837 A1* | 7/2006 | Horton | G08G 1/202 340/539.13 |
| 2007/0083410 A1* | 4/2007 | Hanna | G06Q 10/08 705/333 |
| 2008/0275643 A1 | 11/2008 | Yaqub | |
| 2009/0048890 A1 | 2/2009 | Burgh | |
| 2010/0113073 A1* | 5/2010 | Schlesener | H04W 4/02 455/466 |
| 2013/0091070 A1 | 4/2013 | Barron | |
| 2013/0225196 A1* | 8/2013 | James | H04W 4/029 455/456.1 |
| 2014/0180959 A1 | 6/2014 | Gillen | |
| 2014/0279269 A1 | 9/2014 | Brantley | |
| 2015/0080029 A1* | 3/2015 | Porter | H04W 4/021 455/456.3 |
| 2015/0102903 A1 | 4/2015 | Wilkinson | |
| 2015/0109112 A1* | 4/2015 | Fadell | G08B 27/003 340/328 |
| 2015/0181414 A1* | 6/2015 | Bretscher | H04W 4/12 455/418 |
| 2016/0014564 A1* | 1/2016 | Del Vecchio | G08G 1/20 455/456.2 |
| 2016/0371642 A1 | 12/2016 | Wilkinson | |
| 2017/0039515 A1 | 2/2017 | Wilkinson | |

OTHER PUBLICATIONS

PCT; App. No. PCT/US16/036373; International Search Report and Written Opinion dated Sep. 8, 2016.

* cited by examiner

PRODUCT DELIVERY CONTROL SYSTEMS AND METHODS

RELATED APPLICATIONS

This application claims the benefit of U.S. Provisional application No. 62/182,343, filed Jun. 19, 2015, which is incorporated in its entirety herein by reference.

TECHNICAL FIELD

These teachings relate generally to shopping experiences and more particularly to devices, systems and methods for assisting product delivery.

BACKGROUND

In a modern retail environment, there is a need to improve the customer experience and/or convenience for the customer. Some retailers provide delivery services. Customers can order products and the delivery service will deliver the ordered products to the customer. However, there is a need to improve the delivery service to provide a better customer experience and provide greater convenience for customers.

BRIEF DESCRIPTION OF THE DRAWINGS

The above needs are at least partially met through provision of embodiments of systems, devices, and methods designed to provide product delivery to customers, such as described in the following detailed description, particularly when studied in conjunction with the drawings, wherein.

Figure 1:
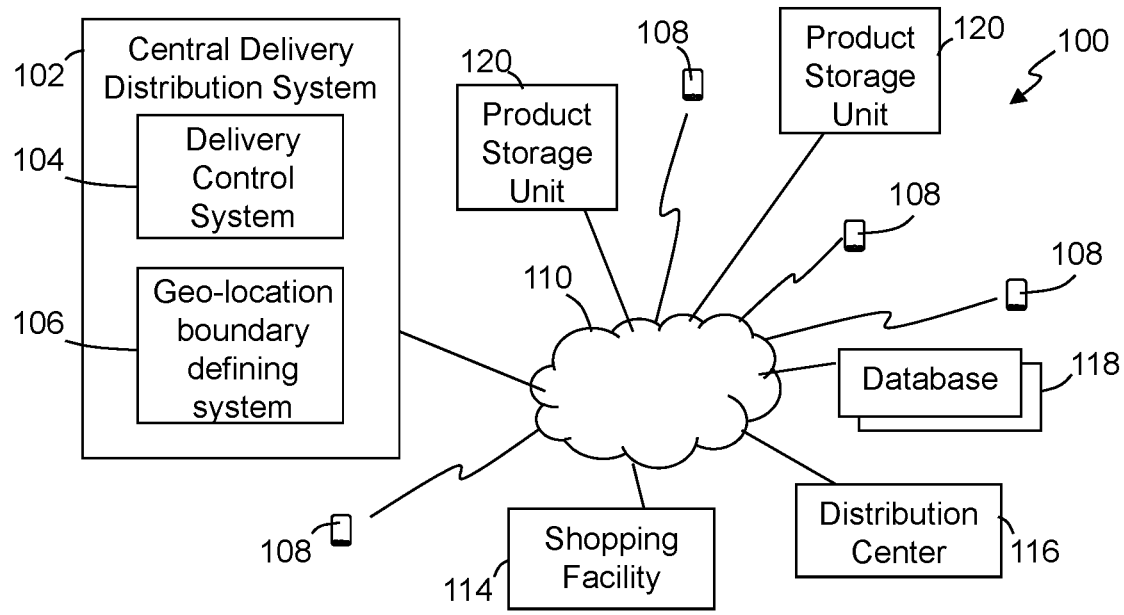
FIG. 1 illustrates embodiments of a delivery scheduling and control system 100 configured to control the delivery of products to numerous customers and numerous geographically distributed delivery sites.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Some shopping facilities and retail services provide product delivery to customers and/or provide at least some control over product deliveries to customers. Further, the product deliveries may be scheduled to accommodate a customer's schedule, preferences, rate of consumption, and the like. Additionally, in some situations, the delivery of products may occur when a customer is not present at a delivery site (e.g., at or near a customer's home, office, at a commuter train station or along a route of travel, at or near an entry gate or entry to a building, etc.). As such, the security of these delivered products can be of some concern. Some embodiments, however, provide one or more product storage units or lockers that are configured to receive products delivered to a customer and be locked. A customer can later unlock the product storage unit and retrieve the delivered products. Accordingly, the product storage units can provide a measure of security to the customer and the products (groceries, prescriptions, office supplies, etc.) delivered to the delivery site.

Further, the secure delivery system can provide delivery without a consumer being present at the time of delivery. Again, customers may set up a manual/automatic shopping delivery method where items are delivered to a secure product storage container or unit at or near a designated delivery site (e.g., at or near a consumer's home). The customer interacts with the delivery system. The interaction allows the customer to select products, set delivery times, set preferences, etc. Further, the customer interaction typically occurs through a graphical user interface displayed to the customer through the customer's user interface unit (e.g., computer, laptop, smartphone, tablet, car navigation system, etc.). In some implementations, a customer accesses a software application (APP) on the customer's smartphone, tablet or the like. In accordance with selected products and a scheduled delivery, the items are delivered and locked in the product storage unit. The consumer can then later retrieve the items from the product storage unit at the customer's convenience. Accordingly, the customer does not need to be present at the time of the delivery, while still providing some security for the delivery of products.

It is further noted, however, that a customer may have a product delivery scheduled and forget to suspend or delay the delivery when the customer is out of town or may not return in time to get the delivered products before one or more of the products spoils, exceed a threshold date (e.g., consume by date, expiration date, etc.), or otherwise is adversely affected due to a duration after the delivery and before the customer can collect the products, may be stolen, or the like. Accordingly, some embodiments automatically suspend a scheduled delivery when it is determined that the customer will not be able to or is unlikely to be able to retrieve the delivered products, such as retrieve the delivered products within a threshold time period.

For example, if a customer leaves town and forgets to inform a product delivery scheduler, system or engine to suspend or pause one or more deliveries, then the timing of deliveries needs to change. Accordingly, some embodiments are configured to identify and/or track geographical locations of a customer (e.g., identifying a geographic location of a customer's user interface unit). The customer's location can be used to detect when and/or predict if a customer is leaving town or is otherwise going to be unable to retrieve the delivered products, or typically retrieve the delivered products within a threshold retrieval period of time. For example, when it is determined that the customer has traveled far enough where the customer is not expected to return to the delivery site (e.g., returning home) within the threshold retrieval period, then a message can be sent to the customer requesting information for when the customer is expected to return. Based on this information product delivery system can adjust one or more scheduled deliveries accordingly. In some instances, if the customer does not respond, the one or more deliveries can be suspended. Further, some embodiments may continue to use the customer's location to detect that the customer is returning, and reschedule one or more deliveries, reschedule deliveries to resume, and/or allow subsequently scheduled deliveries to commence as scheduled. As such, the system does not have to rely on customers notifying the delivery control system regarding when to stop and starting deliveries. Further, the delivery control system can control delivery for substantially any number of customers, and typically more than hundreds of thousands of customers associated with delivery sites that are geographically distributed over cities, counties or states, and in some instances multiple countries.

Referring now to the drawings, FIG. 1 illustrates embodiments of a delivery scheduling and control system 100 configured to control the delivery of products to numerous customers and numerous geographically distributed delivery sites. The delivery scheduling and control system includes a central delivery distribution system 102, multiple user interface units 108 that correspond to different customers, and one or more shopping facilities 114 and/or product distribution centers 116. The central delivery distribution system 102, in some embodiments includes a delivery control system 104, and in some instances may include a geo-location boundary defining system 106. In some embodiments, the delivery scheduling and control system may communicate with one or more of the user interface units 108, the shopping facility 114 and/or the product distribution center 116 through one or more communication and/or data networks 110, such as the Internet, one or more wide area networks (WAN), one or more local area networks (LAN), one or more cellular communication networks, other such networks, or combinations of two or more of such networks.

Further, some embodiment include one or more databases 118 accessible by the delivery control system 104, geo-location boundary defining system 106, shopping facility 114, distribution center 116 and/or user interface units 108. Such databases may be integrated into the delivery control system or separate from it. Such databases may be at the location of the delivery control system, the shopping facility 114, and/or distribution center 116, or remote from one or more of the delivery control system, the shopping facility, and distribution center. Regardless of location, the databases comprise memory to store and organize certain data for use by the delivery control system and geo-location boundary defining system. In some embodiments, the at least one database 118 may store data pertaining to one or more of: customer profile information; customer orders; scheduling for deliveries; product information; customer shopping data and patterns; inventory data; product pricing data; virtual geo-location boundaries and/or coordinates in defining geo-location boundaries; customer locations; past customer locations; customers' movement patterns; customers' previous routes of travel; and/or other relevant information for use in supporting customers, the shopping facilities and distribution centers, and implementing and controlling the delivery of products to delivery sites.

Some embodiments additionally include multiple product storage units 120 that are geographically distributed and provide delivery sites correspond to different customers. Further, in some instances, the product storage units include one or more processors and transceivers configured to communicate with at least the central delivery distribution system. Although FIG. 1 shows four customer user interface units 108, two product storage units, one shopping facility and one distribution center, it will be appreciated that in some embodiments the delivery scheduling and control system 100 can be configured to support hundreds of thousands of customers or more, and maintain scheduling for deliveries for the numerous customers. Similarly, although the central delivery distribution system 102 is depicted as a single device, in some implementations the central delivery distribution system is implemented through multiple devices and/or processors distributed over one or more communication and/or data networks 110. It is understood that more or fewer of such components may be included in different embodiments of the system 100. The user interface unit 108 can be substantially any device that allows a customer to interact with the central delivery distribution system. Often the user interface unit is portable and is used to identify a location of the customer as the user carries the user interface unit. For example, the user interface unit may be a smart phone, a tablet, a laptop, a navigation system of a car, or other such devices.

The central delivery distribution system 102 sets and/or maintains delivery schedules of one or more products to numerous delivery sites for multiple different customers. In some embodiments, such scheduling is implemented through the delivery control system. Further, the delivery control system can be configured to identify when to suspend, delay and/or cancel a delivery because of a customer's location and/or predicted location or destination. Additionally, in some embodiments, the delivery control system identifies and/or tracks customers' locations and determined thresholds, geo-location boundaries and/or virtual fences relative to customers that have scheduled product deliveries. In some embodiments, the central delivery distribution system includes the geo-location boundary defining system 106 that identifies and/or tracks customers' locations and determined thresholds and/or virtual geo-location boundaries relative to customers that have scheduled product deliveries.

As a function of the identified location of a customer, the delivery control system 104 identifies that a customer has traveled beyond a threshold distance or geo-location boundary associated with the customer. In some implementations, in response to identifying that the customer has traveled beyond the boundary, the delivery control system automatically suspends, without customer interaction, one or more scheduled deliveries of one or more products to a delivery site associated with the customer. Some embodiments additionally or alternatively trigger a change in monitoring activity of movements of the first customer, in response to identifying that the first customer has traveled beyond a first geo-location boundary.

Figure 2:
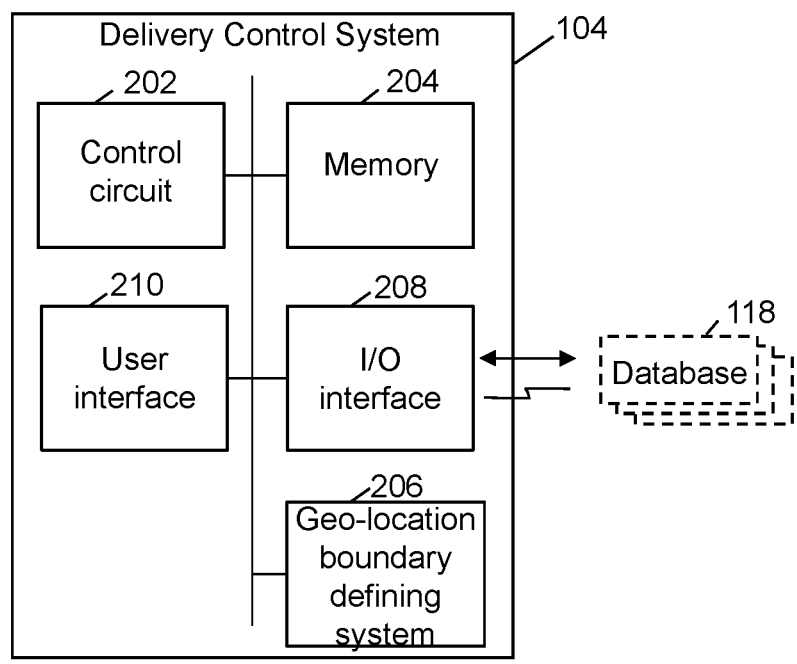
FIG. 2 illustrates a simplified block diagram of an exemplary delivery control system, in accordance with some embodiments.

FIG. 2 illustrates a simplified block diagram of an exemplary delivery control system 104, in accordance with some embodiments. As described above, the delivery control system is configured to receive customer location information, and determines whether a scheduled product delivery of one or more products should be suspended. In this example, the delivery control system includes a control circuit 202, memory 204, and one or more input/output (I/O) interfaces 208. In some implementations, the delivery control system includes one or more user interfaces 210 configured to allow users to interact with the delivery control system. In some embodiments, the delivery control system and/or the control circuit 202 can be implemented through one or more servers and/or computers operated remote from delivery sites, user interface units 108, product storage units 120, and customers' residences. Further, the plurality of computers and/or servers may be distributed over one or more communication networks (e.g., the communication network 110), and may be geographically distributed while still being communication coupled to cooperatively operate to perform the functions of the delivery control system. Similarly, the one or more servers may be implemented remote from shopping facilities 114 and/or distribution centers 116. In other implementations, however, some or all of the delivery control system may be implemented at one or more shopping facilities and/or distribution centers.

Further, the delivery control system may be utilized with a single shopping facility (e.g., such as a store location, shopping mall, retail campus, or the like) or distribution center, while in other implementations, the delivery control system may extend across multiple shopping facility locations and/or distribution centers. The control circuit 202 typically comprises one or more processors and/or microprocessors. The control circuit couples with and/or includes the memory 204. Generally, the memory 204 stores the operational code or one or more sets of instructions that are executed by the control circuit 202 and/or processor to implement the functionality of the delivery control system. In some embodiments, the memory 204 may also store some or all of particular data that may be needed to identify customer locations or when customers pass over or cross geo-location boundaries, suspend scheduled product deliveries, and reschedule suspended deliveries and the like. In some implementations, the memory further stores code, instructions and corresponding data to allow the delivery control system to schedule deliveries, track deliveries, confirm deliveries, receive product delivery requests, define and/or modify geo-location boundaries, other such operations in controlling the suspension of the delivery of products, and the like. Such data may be pre-stored in the memory or be received, for example, from inventory systems, a product ordering system (e.g., operated through a website, an APP on a user interface unit, etc.), point of sale systems, shopping facility systems, product storage units, user interface units, other sources, or combinations of such sources.

It is understood that the control circuit may be implemented as one or more processor devices as are well known in the art. Further, the control circuit may be implemented through multiple processors dispersed over the communication network. Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 204 is shown as internal to the delivery control system; however, the memory 204 can be internal, external or a combination of internal and external memory. Additionally, the delivery control system may include a power supply (not shown) and/or it may receive power from an external source. In some instances, the control circuit 202 and the memory 204 may be integrated together, such as in a microcontroller, application specification integrated circuit, field programmable gate array or other such device, or may be separate devices coupled together. In some applications, the control circuit 202 comprises a fixed-purpose hard-wired platform or can comprise a partially or wholly programmable platform. These architectural options are well known and understood in the art and require no further description here. The control circuit can be configured (for example, by using corresponding programming as will be well understood by those skilled in the art) to carry out one or more of the steps, actions, and/or functions described herein.

The one or more I/O interfaces 208 allow wired and/or wireless communication coupling of the delivery control system to external components, such as the databases 118, the user interface units 108, shopping facilities systems, distribution center systems, point of sale systems, product storage units 120, and other such components. Accordingly, the I/O interface 208 may include any known wired and/or wireless interfacing device, circuit and/or connecting device, such as but not limited to transceivers, receivers, transmitters, and the like. For example, in some implementations, the I/O interface 208 provides wireless communication in accordance with one or more wireless protocols (e.g., cellular, Wi-Fi, Bluetooth, radio frequency (RF), other such wireless communication, or combinations of such communications). In some implementations, the I/O interface includes one or more transceivers configured to couple with and transmit and/or receive communications from over the distributed communication network 110.

One or more user interfaces 210 can be included in and/or couple with the delivery control system, and can include substantially any known input device, such one or more buttons, knobs, selectors, switches, keys, touch input surfaces and/or displays, etc. Additionally, the user interface may include one or more output display devices, such as lights, visual indicators, display screens, etc. to convey information to a user, such as status information, history information, scheduled product deliveries, suspended deliveries, customer location information, product storage unit identifiers, product information, product identifiers, customer profile information, product consumption information, graphical user interfaces, purchase information, notifications, errors, conditions and/or other such information. While FIG. 2 illustrates the various components being coupled together via a bus, it is understood that the various components may actually be coupled to the control circuit 202 and/or one or more other components directly.

As described above, the delivery control system is configured to receive customer location information. For example, global positioning information may be received from a user interface unit 108 that corresponds to a specific customer and is programmed to obtain global positioning information. In some instances, the location information is not continuously provided, but instead provided based on a schedule, based on a customer's movements (e.g., provided each time a customer is stopped or within a limited radius of a location (e.g., at a retail facility) for more than a threshold stop period of time), in response to detecting a change in location of more than a threshold distance, other such instances, or combinations of such instances. Some embodiments, in obtaining location information, attempt to limit battery use of the user interface unit or other device providing the location information. As such, the location information data, notifications or the like may be provided on a schedule, initiated in response to the customer being mobile for more than a threshold amount of time, a customer being substantially stationary for a threshold amount of time, or other instances, or combinations of such instances. Additionally, in some embodiments, the rate at which location information is provided may vary depending on one or more factors, such as but not limited to a location of the customer relative to one or more geo-location boundaries, scheduled delivery date and time, and other such factors. Further, programming on the user interface unit may detect that the user interface unit is receiving remote power, and may increase the frequency of detecting and communicating location information. The location information is evaluated in defining one or more geo-location boundaries, and/or is compared to one or more geo-location boundaries in assessing whether to suspend one or more scheduled product deliveries.

In some embodiments, the delivery control system 104 includes the geo-location boundary defining system 206. The control circuit 202 when implementing instructions and/or code stored in the memory 204 is configured to implement some or all of the functionality of the geo-location boundary defining system. In other embodiments, however, the geo-location boundary defining system 106 is separate from the delivery control system 104 and/or the central delivery distribution system 102.

Figure 3:
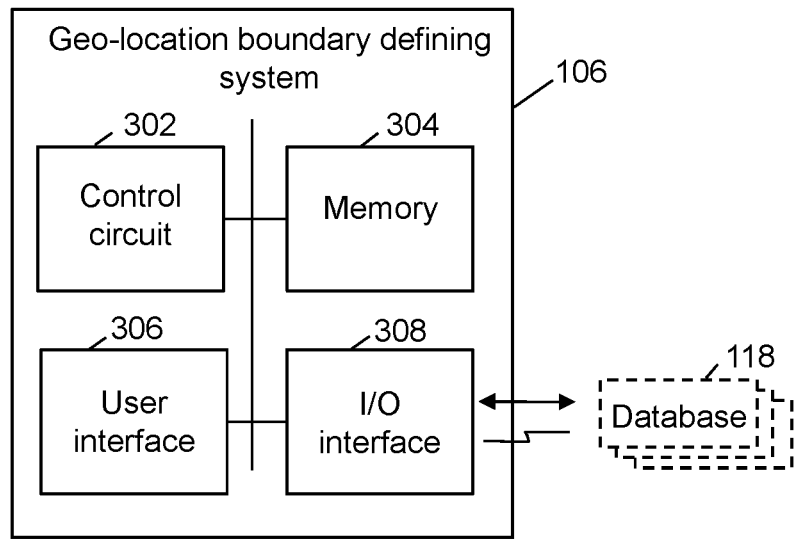
FIG. 3 illustrates a simplified block diagram of an exemplary geo-location boundary defining system, in accordance with some embodiments.

FIG. 3 illustrates a simplified block diagram of an exemplary geo-location boundary defining system 106, in accordance with some embodiments. As described above, the geo-location boundary defining system is configured to use customer movements and location information to define and modify one or more geo-location boundaries relative to a particular customer or set of customers. In this example, the geo-location boundary defining system includes a boundary defining control circuit 302, memory 304, and input/output (I/O) interfaces 308. In some implementations, the geo-location boundary defining system includes one or more user interfaces 306 configured to allow users to interact with the geo-location boundary defining system. In some embodiments, the geo-location boundary defining system and/or the control circuit 302 can be implemented through one or more computers and/or servers operated remote from delivery sites, user interface units 108, product storage units 120, and customers' residences, delivery control system, or the like. Similarly, one or more of the computers and/or servers may be implemented remote from shopping facilities 114 and/or distribution centers 116. In other implementations, however, some or all of the geo-location boundary defining system may be implemented at one or more shopping facilities and/or distribution centers. Further, in some embodiments, the geo-location boundary defining system is implemented through a plurality of computers and/or servers that are distributed over one or more communication networks (e.g., the communication network 110), and may be geographically distributed while still being communication coupled to cooperatively operate to perform the functions of the geo-location boundary defining system.

The boundary defining control circuit 302 typically comprises one or more processors and/or microprocessors. The control circuit 302 couples with and/or includes the memory 304. Generally, the memory 304 stores the operational code or set of instructions that is executed by the control circuit 302 and/or processor to implement the functionality of the geo-location boundary defining system. In some embodiments, the memory 304 may also store some or all of particular data that may be needed to identify customer locations or when customers pass over or cross geo-location boundaries, define geo-location boundaries, modify geo-location boundaries, associate geo-location boundaries with one or more customers, and the like. Such data may be pre-stored in the memory or be received, for example, from inventory systems, a product ordering system (e.g., operated through a website, an APP on a user interface unit, etc.), point of sale systems, shopping facility systems, product storage units, user interface units, other sources, or combinations of such sources.

The boundary defining control circuit 302 may be implemented as one or more processor devices as are well known in the art. Further, the control circuit 302 may be implemented through multiple processors dispersed over the communication network. Similarly, the memory 304 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 304 is shown as internal to the geo-location boundary defining system; however, the memory 304 can be internal, external or a combination of internal and external memory. Additionally, the geo-location boundary defining system may include a power supply (not shown) and/or it may receive power from an external source. In some instances, the control circuit 302 and the memory 304 may be integrated together, such as in a microcontroller, application specification integrated circuit, field programmable gate array or other such device, or may be separate devices coupled together. In some applications, the boundary defining control circuit 302 comprises a fixed-purpose hard-wired platform or can comprise a partially or wholly programmable platform. These architectural options are well known and understood in the art and require no further description here. The control circuit 302 can be configured (for example, by using corresponding programming as will be well understood by those skilled in the art) to carry out one or more of the steps, actions, and/or functions described herein.

The one or more I/O interfaces 308 allow wired and/or wireless communication coupling of the geo-location boundary defining system 106 to external components, such as the databases 118, the user interface units 108, shopping facilities systems, distribution center systems, point of sale systems, product storage units 120, and other such components. Accordingly, the I/O interface 308 may include any known wired and/or wireless interfacing device, circuit and/or connecting device, such as but not limited to transceivers, receivers, transmitters, and the like. For example, in some implementations, the I/O interface 308 provides wireless communication in accordance with one or more wireless protocols (e.g., cellular, Wi-Fi, Bluetooth, radio frequency (RF), other such wireless communication, or combinations of such communications). In some implementations, the I/O interface 308 includes one or more receivers and/or transceivers configured to couple with and receive and/or transmit communications from over the distributed communication network 110.

One or more user interfaces 306 can be included in and/or couple with the geo-location boundary defining system 106, and can include substantially any known input device, such one or more buttons, knobs, selectors, switches, keys, touch input surfaces and/or displays, etc. Additionally, the user interface 306 may include one or more output display devices, such as lights, visual indicators, display screens, etc. to convey information to a user, such as status information, history information, scheduled product deliveries, suspended deliveries, customer location information, product storage unit identifiers, product information, product identifiers, customer profile information, product consumption information, graphical user interfaces, purchase information, notifications, errors, conditions and/or other such information. While FIG. 3 illustrates the various components being coupled together via a bus, it is understood that the various components may actually be coupled to the control circuit 302 and/or one or more other components directly.

In some embodiments, the geo-location boundary defining system 106 includes a boundary defining control circuit 302, and memory 304 coupled to the boundary defining control circuit storing computer instructions that are executed by the boundary control circuit. The boundary control circuit is configured to receive multiple location information notifications over one or more periods of time from mobile customer user interface units associated with different customers and/or other sources of location information. The geo-location boundary defining system can use the location information to determine, with respect to the different customer user interface units, geo-location boundaries corresponding to geographic areas defined in accordance with statistical distances from delivery sites that the customer user interface units travel.

For simplicity, the below embodiments herein are described with respect to the delivery control system 104 comprising the geo-location boundary defining system, and determining and adjusting geo-location boundaries, and identifying customers' locations relative to one or more geo-location boundaries. It will be appreciated by those skilled in the art that, in some embodiment, some or all of the geo-location boundary defining system may be external to the delivery control system 104. Similarly, in some embodiments, some or all of the geo-location boundary defining system may be external to the central delivery distribution system 102. Further, in some embodiments, some of the functionality of the delivery control system may be implemented at the user interface unit. For example, in some implementations, the APP on the user interface unit causes a processor on the user interface unit to implement code to evaluate location information relative to one or more geo-location boundaries, which are typically provided to the user interface unit from the delivery control system or geo-location boundary defining system. In such an implementation, the APP can notify the delivery control system when a boundary is crossed.

One or more geo-location boundaries can be defined for each customer for which location information is used to determine whether to suspend a delivery. Some embodiments set one or more default geo-location boundaries, such as when a customer elects to participate in allowing the delivery control system 104 to identify whether and when to suspend a delivery, when insufficient data is available to otherwise define a geo-location boundary, and the like. One or more factors can be considered in setting the one or more geo-location boundaries. Some embodiments determine estimated times of travel in setting one or more geo-location boundaries. In some instances, the delivery control system 104 and/or the geo-location boundary defining system 106 obtain over time numerous location information data and/or entries corresponding to a customer's movements. For example, the location information may be global position coordinates from a global position system (GPS) or other location information from the customer's user interface unit, or other device. The numerous location information can be statistically analyzed to identify typical ranges of travel, mean or average distances of travel, standard deviations of distances traveled and other statistical parameters that can be used to set and/or adjust one or more geo-location boundaries. Some embodiments use a standard deviation of travel distances from the delivery site (or other location, such as a customer's residence) in setting or adjusting a geo-location boundary. For example, a geo-location boundary may be defined as three times the standard deviation of the mean distance traveled. Other statistical deviations may additionally or alternatively be considered, such as but not limited to average absolute deviation, mean absolute deviation, and the like.

Some embodiments may disregard some distances that are greater than a threshold distance when determining a mean or average distance so that typical distances are considered and atypical distances are not used in determine one or more of the geo-location boundaries. As such, some embodiments may identify outlier distances in determining one or more geo-location boundaries (e.g., Chauvenet's criterion, Grubbs' test for outliers, Peirce's criterion, etc.). Further, the atypical distances may be used in determining one or more other geo-location boundaries and/or in recognizing patterns, such as when a customer typically leaves the delivery site for multiple days. In some embodiments, a geo-location boundary may be defined that includes a certain percentage of location information and/or routes of travel. For example, a geo-location boundary may be established such that 70%, 80%, 95% or some other percentage of locations are included within the boundary. The percentage may vary depending on one or more factors, such as amount of variation in distances traveled from a site location within a threshold time, concentrations of travel, concentration of travel within a given time period, time of year (e.g., taking into consideration holidays, children out of school, etc.), and the like. Similarly, different geo-location boundaries may be defined for different days (e.g., boundaries for weekends may be generally larger for some customers as customers more often travel greater distances relative to weekends). Some embodiments set one or more geo-location boundaries such that a customer during a typical day would not cross a boundary. Further, the geo-location boundary may be set with a margin of error (e.g., five miles beyond typical travel distances for a typical day). Still further, one or more geo-location boundary may be defined based on previous patterns of travel. For example, it may be determined over time that there is a certain percentage threshold likelihood that a customer will not return to the delivery site within a threshold time when the customer crosses a location or defined geo-location boundary based on past times that the custom crossed the location or geo-location boundary. A geo-location boundary may similarly be defined relative to a probability that a customer is returning.

Still further, some embodiments evaluate travel times relative to distances from a delivery site, and based on the travel time relative to a threshold travel time may disregard these distances when determining one or more geo-location boundaries, while using these distances when defining other geo-location boundaries. Some embodiments may further identify distances traveled when the customer stays away from the delivery location for longer than a threshold period of time and discard those distances when defining one or more geo-location boundaries, while using these distances when establishing other geo-location boundaries. In some implementations, one or more geo-location boundaries may be defined based on a travel time. For example, a geo-location boundary may be set in accordance with a determination that beyond a threshold distance the customer likely would not be able to return to the delivery site with a threshold period of time of the scheduled and/or predicted time of the product delivery.

The geo-location boundaries define one or more boundaries of distance and/or travel time from a designated location (e.g., delivery site, customer's residence, customer's place of business, etc.). In some instances, a geo-location boundary defines an area extending around and including the designated location. For example, a geo-location boundary may represent a virtual fence about the designated location, which may be a circle, amorphous shape with points along the boundary being different distances from the designated location, or other shape. In other instances, a geo-location boundary may correspond to a location on a road, train track or other route of travel, or define multiple locations along multiple different roads, train tracks or other routes of travel. Further, some embodiments define geo-location boundaries corresponding to locations of travel, such as airports, train stations, ship docks and the like. Accordingly, some embodiments identify when a customer approaches or reaches a boundary (e.g., corresponding to an airport), and may further recognize that subsequent location information is not being received (e.g., because a customer has turned off the user interface unit, no longer has a cellular communicate signal, etc.), which may be indicative that the customer commenced traveling (e.g., boarded an airplane).

In some embodiments, the delivery control system and/or geo-location boundary defining system define multiple geo-location boundaries corresponding to each customer that has taken advantage of the automated suspension of deliveries. For example, a first geo-location boundary may be defined that corresponds to typical distances traveled from the delivery site (e.g., within two times the standard deviation of distances traveled) and/or corresponds to a distance that corresponds to a threshold estimated travel time. One or more actions may be initiated by the delivery control system in responds to identifying that a customer has crossed or traveled beyond the first geo-location boundary. Similarly, a second geo-location boundary may be defined for the same customer, with one or more other actions to be taken in response to identifying that the customer has crossed the second geo-location boundary. The second geo-location boundary may be a further distance from the delivery site or other designated location than the first geo-location boundary. Substantially any number of geo-location boundaries can be defined and associated with a single customer, with one or more actions to be taken in response to detecting that the customer has crossed or is otherwise within a threshold distance of the boundary. The geo-location boundary can be defined by geographic coordinates (e.g., longitude and latitude coordinates), coordinates based on a geographic mapping, distance measurements, locations on routes of travel, or other such references or combinations of such references.

Again, different actions and/or tasks may be initiated in response to detecting that a customer has crossed a geo-location boundary. For example, a first geo-location boundary may correspond to suspending a scheduled delivery. A geo-location boundary may correspond to requesting a confirmation from the customer that the customer does in fact wish a product delivery to be suspended or rescheduled. A geo-location boundary may correspond to triggering a change in monitoring activity of movements of the customer. A geo-location boundary may correspond to initiating some data analytics to determine whether a detected customer movement and/or movement pattern was performed or similarly performed in the past. A geo-location boundary may correspond to identifying that a customer is returning and rescheduling a previously suspended product delivery, or authorizing a scheduled product delivery that was scheduled to occur after the time of detecting the customer crossing the geo-location boundary. Other actions may be initiated in response to detecting the customer crossing a geo-location boundary, and in some embodiments, multiple actions may be initiated in response to detecting a customer crossing a geo-graphic boundary associated with the customer.

Figure 4:
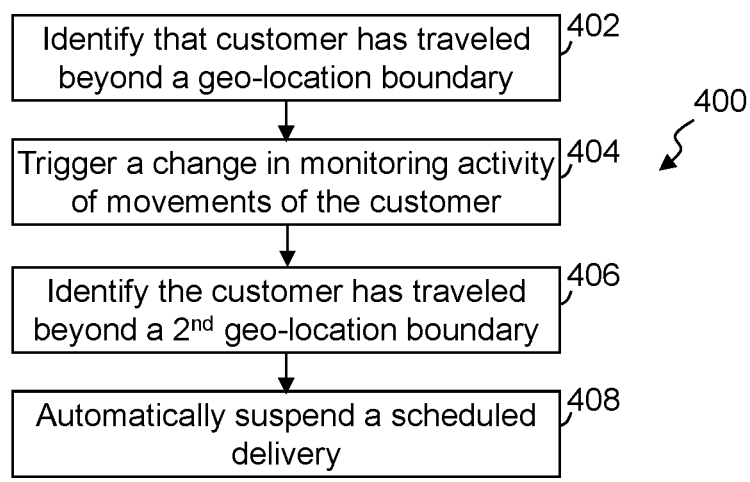
FIG. 4 illustrates a simplified flow diagram of an exemplary process of controlling the delivery of products, in accordance to some embodiments.

FIG. 4 illustrates a simplified flow diagram of an exemplary process 400 of controlling the delivery of products, in accordance to some embodiments. In step 402, the delivery control system 104 identifies that a customer has traveled beyond a first geo-location boundary associated with the customer. In some embodiments, the customer registers with the server to determine whether to suspend deliveries, and provides relevant location information corresponding to the customer (e.g., from the customer's user interface unit) that are evaluated relative to one or more geo-location boundaries. Again, the boundaries may be a default boundary, a boundary defined based on the customer's past movements and the like. Further, customer location information can be received or determined. For example, the customer's user interface unit communicates current location information of the customer. In some instances, the customer location information is provided based on a schedule, which may vary depending on a proximity to a boundary; in response to a request from the delivery control system, again which may be dependent on a customer's proximity to a boundary and/or a direction of travel; based on one or more conditions (e.g., detected movement for more than a threshold period of time, detected stop or limited movement or movement at less than a threshold speed for more than a period of time, and other such conditions); and the like, or combinations of two re more of such factors. The customer's location and/or a predicted location (e.g., based on past location information) is compared to one or more geographic coordinates defined by at least one of the geo-location boundaries (e.g., a coordinate defined on a freeway at a determined boundary distance and/or travel time from the delivery site). Further, in some instances, the customer location information may be received, requested and/or evaluated based on a delivery scheduled to occur. For example, the evaluation of the customer's location may be implemented in response to the delivery being scheduled to occur within the threshold time.

In step 404, a change in monitoring activity of movements of the customer is trigger in response to identifying that the customer has traveled beyond the first geo-location boundary. The change in monitoring activity may include causing an increase in a regularity of location information being receive and/or evaluated, evaluating location information to one or more additional geo-location boundaries, considering location information of one or more other customers that are associated with the customer being considered, and other such changes in monitoring.

In step 406, it may be identified that the customer has traveled beyond a second geo-location boundary associated with the customer. Again, the customer's location and/or a predicted location (e.g., based on past location information) can be compared to one or more geographic coordinates defined by at least a second geo-location boundary (e.g., a coordinate defined on a freeway at a determined boundary distance and/or travel time from the delivery site). In some implementations the second geo-location boundary is further from the delivery site than the first geo-location boundary. In some embodiments, the second geo-location boundary may correspond to a determined travel distance that is determined to be too far from the delivery site for the customer to return within a threshold time of the scheduled delivery. The second geo-location boundary may additionally or alternatively be identified as being consistent with previous travel patterns where the customer was away from the delivery site for a threshold duration. In step 408, a scheduled delivery of the one or more products scheduled to be delivered to the delivery site is automatically suspended in response to identifying that the customer has traveled beyond the second geo-location boundary.

In some embodiments, the delivery control circuit 202 of the delivery control system 104 is further configured to request confirmation from a customer that a delivery should be suspended. For example, the delivery control circuit can trigger a confirmation query requesting the customer confirm that a scheduled delivery of one or more products to a delivery site is to be suspended (e.g., having the user interface unit display a message "It appears you are leaving town, please confirm that your product delivery scheduled for tomorrow at 8:00 should be suspended", with one or more options, such as an option to confirm, an option to reject). Additional options and/or questions may be posed to the customer such as, but not limited to, an option to specify a rescheduled delivery, an option to schedule when product deliveries should resume, etc. In some instances, the delivery control circuit is configured to cause a communication to be transmitted to the customer's user interface unit, in response to identifying that the customer crossed the first geo-location boundary, the second geo-location boundary and/or another geo-location boundary, requesting that the customer confirm that the scheduled delivery be suspended. In other instances, the APP on the user interface unit may detect that a geo-location boundary has been crossed, and display a request, generate an audio request, or the like, requesting confirmation from the customer. Further, some embodiments in issuing a request for confirmation attempt to issue such requests taking into consideration the customer's safety. For example, some embodiments, in triggering a confirmation query are further configured to predict that it is safe for the customer to receive the confirmation query and cause a communication of the confirmation query (e.g., to a user interface unit associated with the customer) in response to predicting that it is safe for the customer to receive the confirmation query. The predicted safety can include receiving information that the customer has not moved more than a threshold distance during a threshold period of time indicating that the customer is not in a moving vehicle where receiving such a query may distract the customer from driving. Similarly, in triggering the confirmation query, the delivery control circuit may take into consideration a time of day, such as not sending a query between 10:00 PM and 6:00 AM to avoid waking the customer up. It is noted that many of these parameters may be defined or modified by the customer, such as in a customer profile. Accordingly, in taking into consideration the time, the customer may specify that such confirmation queries not be communicated between 11:00 PM and 5:00 AM, or only communicated between 9:00 AM and 5:00 PM, or other such selections. Similarly, some actions that are associated with a geo-location boundary may be selected by the customer, and/or the customer may request or have some control over the defining of one or more geo-location boundaries.

Further, some embodiments trigger a change in monitoring activity to detect a pattern of movement or travel of a customer. The delivery control circuit, in triggering the change in monitoring activity, can be further configured to determine whether a detected movement pattern of the customer is similar to a previous movement pattern of the first customer detected in the past. The determination of whether to suspend the delivery can be dependent on whether a pattern of movement is consistent with previous patterns. For example, the delivery control circuit may detect that movement of the customer is consistent with previous movements of the customer when delivery was suspended and initiate a suspension of one or more subsequent deliveries and/or request confirmation that deliveries should be suspended. Similarly, the delivery control circuit may identify that customer movements are consistent with previous movements where the customer confirmed that deliveries should not be suspended, and thus does not suspend deliveries.

Some embodiments further evaluate location information and/or movement of the customer in determining when and if a delivery should be rescheduled and/or removing a suspension of a scheduled delivery. The delivery control circuit can be configured, in some embodiments to identify that a customer has crossed or is approaching a third geo-location boundary associated with the customer. The suspended delivery of the one or more products to the delivery site can be automatically rescheduled in response to identifying that the customer has crossed the third geo-location boundary. In other instances, the previously scheduled delivery is not rescheduled, and instead a subsequently scheduled delivery is allowed to occur. In yet other instances, the previously scheduled delivery is not rescheduled, but a subsequently scheduled delivery may be adjusted, such as moving the delivery time earlier or later depending on the crossing of the geo-location boundary and/or an estimated time of arrival at or near a delivery site. In some implementations, the customer is notified of the rescheduling and/or modifications of the delivery. Still further, some embodiments and/or in some instances the customer is requested to confirm the rescheduled delivery.

As described above, some embodiments include the geo-location boundary defining system that is configured to define one or more geo-location boundaries for customers that schedule product deliveries and/or participate in other options where products are delivered (e.g., participate in a meal plan service where one or more products used in preparing a pre-planned meal (typically planned by a shopping facility or other service) are delivered to a customer, utilize a product delivery APP, utilize a meal plan APP, or the like). The geo-location boundary defining system may include a boundary defining control circuit 302, and a memory 304 coupled to the boundary control circuit and storing computer instructions to be executed by the boundary control circuit. The boundary control circuit can be configure to receive multiple location information notifications over one or more periods of time from a mobile customer user interface unit associated with a customer, and determine, with respect to the customer user interface unit, a geo-location boundary corresponding to a geographic area defined in accordance with statistical distances from the delivery site that the customer user interface unit travels. Further, the boundary control circuit can be configured to determine one or more geo-location boundaries corresponding to distances that are within travel time thresholds from the delivery site.

Some embodiments may further adjust one or more geo-location boundaries over time and/or based one or more factors. For example, further location information may be received over time and based on statistical evaluation of the movement of the customer over time, one or more geo-location boundaries may be modified (e.g., a customer gets a new job resulting in different distances traveled, customer's child changes schools resulting in different routes traveled, previous location information was insufficient sample pool, or other such factors). Some embodiments may further consider the one or more products to be delivered and adjust one or more geo-location boundaries as a function of one or more products being delivered. For example, when a product needs to be refrigerated, a geo-location boundary may be decreased such that the customer is expected to return to the delivery site within a threshold time period. As another example, a product may include a product that requires confirmation of receipt, and as such, one or more geo-location boundaries may be adjusted so that it is predicted the customer (or other person associated with the customer (e.g., husband) will be present at the delivery site when the delivery is predicted to occur). As yet another example, the products being delivered are non-perishable products, and accordingly, one or more geo-location boundaries may be adjusted (e.g., expanded), as it may be satisfactory that the delivered products are not retrieved for a greater threshold period of time. Accordingly, in some embodiments the delivery control circuit is further configured to automatically adjust one or more geo-location boundaries as a function of at least one product of one or more products of the scheduled delivery.

In some embodiments, the delivery control circuit evaluates multiple associated customers relative to one or more geo-location boundaries and in determining whether to suspend a delivery. For example, a husband and wife may be associated by the central delivery distribution system, and the delivery control system evaluates location information for both the husband and the wife relative to one or more geo-location boundaries in determining whether to suspend a scheduled delivery. The geo-location boundaries may be different for the husband than for the wife, yet the evaluation considers the location information for both. Similarly, location information for children of a family (e.g., children older than 16 or other than an age selected by a parent in a customer profile) may also be evaluated relative to one or more geo-location boundaries in determining whether to suspend delivery to a family. Different rules can be applied depending on the number of people in the family, the ages of the members of the family, and the like. In some implementations, the customers define parameters relative to different members of the family, such as when a child is capable of accepting deliveries, whether all family members must cross one or more geo-location boundaries before a delivery is suspended, and the like. Similarly, the delivery control system may establish one or more rules or conditions, such as requiring children to be of a certain age before being able to accept deliveries, whether user interface units of children are to be considered when evaluating whether to suspend a delivery, and other such rules.

In some embodiments, the delivery control circuit is further configured to identify that multiple customers have traveled beyond a geo-location boundary associated with a first or second customer, wherein the multiple customers are associated with each other. The automatic suspension of the scheduled delivery of the one or more products can be initiated in response to identifying that the multiple customers have traveled beyond the geo-location boundary. Alternatively, the delivery control circuit can inhibit suspension of a schedule delivery, even though a first customer has crossed a geo-location boundary where a delivery would normally be suspended, in response to identifying that a second customer associated with the first customer and/or the delivery site is within the same or a different geo-location boundary. Further, a rule may be established that when a first customer has crossed a geo-location boundary while the second customer is within the same or a separate geo-location boundary the delivery is not suspended, yet when the second customer has crossed a geo-location boundary the delivery is suspended regardless of whether the first customer has crossed a geo-location boundary. Other such rules may be established, and may be dependent upon which geo-location boundaries are crossed and/or not crossed.

In some embodiments, the evaluation of a customer's location information may be at least partially performed at the user interface unit 108, such as through an APP on the customer's user interface unit. The user interface unit can include one or more delivery control circuits, which can be implemented through one or more processors and/or microprocessors coupled to memory and implementing code and/or instructions stored on the memory. The code to implement the APP is typically stored on memory of the user interface unit and implemented by the delivery control circuit. In some implementations, the delivery control circuit can locally evaluate location information of the user interface unit relative to one or more geo-location boundaries in determining whether one or more scheduled deliveries should be suspended. The delivery control circuit, in causing the suspension of as scheduled delivery, can be further configured to wirelessly communicate to a remote central delivery distribution system a request that the scheduled delivery be suspended. Similarly, the user interface unit may detect that the user interface unit has crossed a first geo-location boundary, and in response to this detection start to communicate location information to the remote central delivery distribution system 102. This can limit the amount of location information that is obtained and/or transmitted to the remote delivery control system. Further, the rate at which the user interface unit provides location information may be modified as the user interface unit detects its location relative to one or more geo-location boundaries. Similarly, the remote delivery control system 104 may notify the user interface unit to modify the rate at which location information is provided based on a location of the user interface unit relative to one or more geo-location boundaries (e.g., increase or decrease the rate as the user interface unit approaches or crosses one or more geo-location boundaries).

In some embodiments, the delivery control system may initiate an evaluation of a location of a customer in response to identifying that a scheduled delivery is scheduled to occur within a threshold delivery time. For example, the delivery control system may identify that a product delivery is scheduled to occur in 24-hours for a customer. Based on this identification, the delivery control system may obtain location information for the customer, and evaluate this location information relative to one or more geo-location boundaries and/or anticipated travel times. Further, the delivery control system may continue to receive location information notifications and/or data for the customer over the 24-hours, and evaluate the location information relative to the one or more geo-location boundaries and/or anticipated travel times. Again, some embodiments, in obtaining location information, attempt to limit battery use of the user interface unit or other device providing the location information.

The delivery control circuit, in some implementations can be configured to further use the customer location information for other proposes. For example, the delivery control circuit can receiving location information and identify that a customer has returned home or is within a threshold distance of the delivery site, and send a notification or reminder when a delivery has been made. This can include reminding the customer that a delivery was made to a product storage unit 120. The reminder may be sent after a threshold period of time, which may be dependent on when a customer is at or near the delivery site, that the delivery control circuit has not received confirmation from a product storage unit, from a customer, or other source that one or more delivered products were retrieved.

As described above, some embodiments utilize one or more default geo-location boundaries. Such default geo-location boundaries may be set and utilized for various reasons such as, but not limited to, the geo-location boundary defining system not having sufficient enough location data to accurately define one or more geo-location boundaries, constant boundaries (e.g., proximate hubs of travel), and the like. The defaults may be set based on estimated times of travel (e.g., customer likely would be unable to return in time), typical geo-location boundaries and/or distances of travel for other customers (e.g., customers that are within a given geographic distance from the customer for which the default geo-location boundary is being set), information provided by a customer (e.g., location of preferred retail facility relative to delivery site location, address of employment, address of child's school, etc.), other such factors, or combinations of such factors. Such default geo-location boundaries can be replaced and/or modified over time, such as after the geo-location boundary defining system receives sufficient numbers of location information over time, in response to receiving additional information, and the like. Similarly, in some implementations, customers may be allowed to modify one or more geo-location boundaries. For example, a graphical user interface may be displayed to the customer with options allowing the user to set boundaries (e.g., by distance, by location information (e.g., cross-streets, addresses, name of a business, etc.), notifications that previous suspension should not have occurred, in response to confirmation queries, and the like), by dragging one or more points on a displayed geo-location boundary that is displayed over a mapping, and the like. Some embodiments are further configured to allow a customer to set and/or modify one or more parameters relative to one or more geo-location boundaries (e.g., set or modify one or more threshold amounts of time that a customer has to be beyond one or more geo-location boundaries before a confirmation query is communicated and/or before delivery is suspended, set associations between other customers, and the like).

Figure 5:
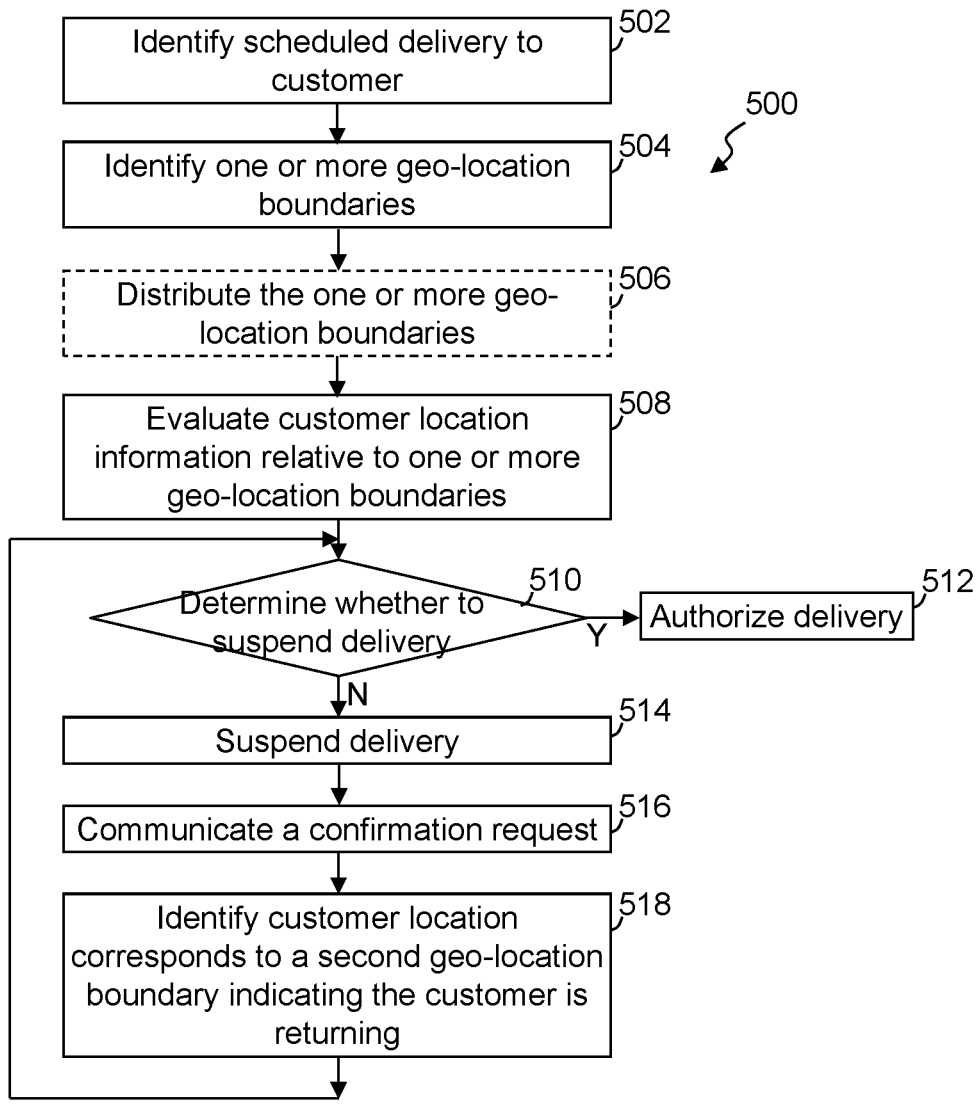
FIG. 5 illustrates a simplified flow diagram of an exemplary process of controlling the delivery of products, in accordance with some embodiments.

FIG. 5 illustrates a simplified flow diagram of an exemplary process 500 of controlling the delivery of products, in accordance with some embodiments. In step 502, it is identified that a product delivery is scheduled for one or more customers. For example, a meal planning engine may have specified planned deliveries of ingredients to one or more customers. Again, the deliveries may be to a customer's residence, a product storage unit 120, a business location, or other such delivery sites. In other instances, a customer may have scheduled a delivery, scheduled deliveries based on a predefined schedule (e.g., weekly), a delivery may be scheduled based on a predicted consumption rate of a product (e.g., milk, eggs, or other such products), or the like. Accordingly, a scheduling system may have records of pending deliveries, and in response to a delivery being within a threshold time notifies the delivery control system. In step 504, one or more geo-location boundaries are identified and/or calculated for one or more customers. In some implementations, the geo-location boundary defining system 106 determines one or more boundaries based on statistical analysis. In some embodiments, the geo-location boundary may be calculated by distributed cloud service, and may be based on a time required for the customer to return to the delivery site or a proximate location within a threshold time of the delivery (e.g., in time for delivery; within a time prior to a product changing temperatures to a threshold temperature, which may take into consideration current and future environmental conditions at the delivery site; and the like).

Some embodiments include optional step 506, where one or more geo-location boundaries are distributed to the delivery control system 104, a user interface unit 108, or other system. For example, in some implementations, the customer's location is evaluated at a user interface unit. As such, the one or more geo-location boundaries may be distributed to the user interface unit to evaluate the customer's current location relative to the one or more geo-location boundaries. In step 508, the customer location information is evaluated relative to one or more geo-location boundaries. In step 510, it is determined whether the delivery should be suspended based on the customer's location relative to the one or more geo-location boundaries. When a delivery should occur, the process advances to step 512 where delivery is authorized.

In step 514, the delivery is suspended. Some embodiments include step 516 to request confirmation from the customer that the delivery should be suspended. In some implementations, a request is communicated to the customer prior to suspending the delivery. Further, some embodiments include step 518, where location information continues to be evaluated relative to one or more geo-location boundaries in detecting and/or predicting that a customer is returning home or proximate to the delivery site.

Accordingly, some embodiments can predict and/or detect when customers have left town or otherwise predict that a customer is going to be unable to retrieve a delivery within a threshold time period. Based on such predictions, the delivery control system can stop a delivery from occurring. Similarly, the delivery control system may predict that the customer is returning home and initiate a delivery, reschedule a delivery, or authorize the delivery of one or more subsequently scheduled deliveries.

In some embodiments, apparatuses, systems and methods are provided herein useful to providing control over product deliveries to customers of a shopping facility. In some embodiments, a system comprises: a delivery control system comprising: a delivery control circuit; and a memory coupled to the delivery control circuit and storing computer instructions that when executed by the delivery control circuit cause the delivery control circuit to: identify that a first customer has traveled beyond a first geo-location boundary associated with the first customer; trigger, in response to identifying that the first customer has traveled beyond the first geo-location boundary, a change in monitoring activity of movements of the first customer; identify that the first customer has traveled beyond a second geo-location boundary associated with the first customer; and automatically suspend the scheduled delivery of the one or more products to the delivery site in response to identifying that the first customer has traveled beyond the second geo-location boundary.

In some embodiments, a method comprises: by a control circuit of a product delivery control system: identifying that a first customer has traveled beyond a first geo-location boundary associated with the first customer; triggering, in response to identifying that the first customer has traveled beyond the first geo-location boundary, a change in monitoring activity of movements of the first customer; identifying that the first customer has traveled beyond a second geo-location boundary associated with the first customer; and automatically suspending the scheduled delivery of the one or more products to the delivery site in response to identifying that the first customer has traveled beyond the second geo-location boundary.

Some embodiments provide apparatuses, systems and methods of providing control over product deliveries to customers of a shopping facility. In some embodiments, such systems include a delivery control system comprising: a delivery control circuit; and a memory coupled to the delivery control circuit and storing computer instructions that when executed by the delivery control circuit cause the delivery control circuit to: electronically receive current location information of a first customer user interface unit; automatically determine, without customer interaction and based on the current location information of the first customer user interface unit, that the first customer user interface unit is beyond a geo-location boundary corresponding to the first customer user interface unit; cause a suspension of a scheduled delivery of one or more products to a the delivery site in response to determining that the first customer user interface unit is beyond the geo-location boundary corresponding to the first customer user interface unit. In some implementations, the geo-location boundary is defined in accordance with average distances from a delivery site that first customer user interface unit travels, and distances that are within a travel time threshold from the delivery site. The delivery control circuit in causing the suspension or delay of the schedule delivery is further configured to wirelessly communicate to a remote central delivery distribution system a request that the scheduled delivery be delayed.

Some embodiments comprise a geo-location boundary defining system that comprises: a boundary control circuit; and a first memory coupled to the boundary control circuit and storing computer instructions that when executed by the boundary control circuit cause the boundary control circuit to: receive location information from multiple different mobile customer user interface units over one or more periods of time; and determine, with respect to each of the different mobile customer user interface units, a geo-location boundary corresponding to a geographic area defined in accordance with average distances from a delivery site that the corresponding one of the multiple mobile customer user interface units travels, and distances that are within a travel time threshold from the delivery site.

Some embodiments provide methods, systems and apparatuses that provide control over product deliveries to customers of a shopping facility, and comprise: a geo-location boundary defining system comprising: a boundary control circuit; and a first memory coupled to the boundary control circuit and storing computer instructions that when executed by the boundary control circuit cause the boundary control circuit to: receive location information from multiple different mobile customer user interface units over one or more periods of time; determine, with respect to each of the different mobile customer user interface units, a geo-location boundary; and a delivery control system comprising: a delivery control circuit; and a second memory coupled to the delivery control circuit and storing computer instructions that when executed by the delivery control circuit cause the delivery control circuit to: receive current location information of the multiple different customer user interface units; suspend a delivery of one or more products to a first delivery site corresponding to a first customer user interface unit in response to determining, based on current location information of the first customer user interface unit, that the first customer user interface unit is beyond a first geo-location boundary corresponding to the first customer user interface unit. In some implementations the geo-location boundary corresponds to a geographic area defined in accordance with average distances from a delivery site that the corresponding one of the multiple mobile customer user interface units travels, and distances that are within a travel time threshold from the delivery site.

The delivery control circuit may be further configured to identify that a product delivery is scheduled within a threshold delivery time for the first delivery site, and determine, in response to identifying the scheduled product delivery is within the threshold delivery time, based on the current location information of the first customer user interface unit, whether the first customer user interface unit is beyond the first geo-location boundary corresponding to the first customer user interface unit. In some embodiments, the delivery control circuit is further configured to: cause a request be communicated, in response to determining that the first customer user interface unit is beyond the first geo-location boundary, to the first customer user interface unit requesting confirmation from a first customer associated with the first customer user interface unit that the delivery should be suspended; and implement the suspension of the delivery of the one or more products to the first delivery site in response to receiving a confirmation that the delivery should be delayed.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system providing control over product deliveries to customers of a shopping facility, comprising:
   a geo-location boundary defining system comprising:
      a boundary control circuit; and
      a first memory coupled to the boundary control circuit and storing computer instructions that when executed by the boundary control circuit cause the boundary control circuit to:
         receive multiple location information notifications over one or more periods of time from a mobile first customer interface unit associated with the first customer, wherein the one or more period of time comprise at least multiple days;
         identify, over time based on past movements of the first customer interface unit, patterns of travel by the first customer over the one or more periods of time; and
         determine, with respect to the first customer interface unit and relative to a scheduled delivery, a set of multiple geo-location boundaries comprising a first geo-location boundary corresponding to a first geographic area defined based on the patterns of travel and in accordance with statistical distances from a delivery site that the first customer interface unit travels, and a different second geo-location boundary based on the patterns of travel, such that the first geo-location boundary and the second geo-location boundary are both defined prior to currently monitoring movement of the first customer interface unit based on the scheduled delivery at the delivery site and the first and second geo-location boundaries are used during a current evaluation relative to the scheduled delivery based on current movements of the first customer user interface;
a delivery control system comprising:
 a delivery control circuit; and
 a memory coupled to the delivery control circuit and storing computer instructions that when executed by the delivery control circuit cause the delivery control circuit to:
  initiate a current monitoring of locations of the first customer interface unit based on a scheduled delivery at the delivery site;
  identify that a first customer has traveled beyond the first geo-location boundary associated with the first customer;
  trigger, in response to identifying that the first customer has traveled beyond the first geo-location boundary, a change in monitoring activity of movements of the first customer;
  identify that the first customer has traveled beyond the second geo-location boundary associated with the first customer; and
  automatically suspend a scheduled delivery of one or more products to a delivery site in response to identifying that the first customer has traveled beyond the second geo-location boundary.

2. The system of claim 1, wherein the delivery control circuit is further configured trigger, in response to identifying that the first customer has traveled beyond the first geo-location boundary, a confirmation query requesting the first customer confirm that a scheduled delivery of one or more products to a delivery site is to be suspended.

3. The system of claim 2, wherein the delivery control circuit in triggering the confirmation query is further configured to predict that it is safe for the first customer to receive the confirmation query and causes a communication of the confirmation query in response to predicting that it is safe for the first customer to receive the confirmation query.

4. The system of claim 1, wherein the delivery control circuit in triggering the change in monitoring activity is further configured to determine whether a detected movement pattern of the first customer is similar to a previous movement pattern of the first customer detected in the past.

5. The system of claim 1, wherein the boundary control circuit is further configured to determine the second geo-location boundary corresponding to distances that are within a travel time threshold from the delivery site and at least the second geo-location boundary is defined based on an identify threshold likelihood that the first customer will not return to the delivery site within a first threshold time of the first customer crossing the second geo-location boundary.

6. The system of claim 1, wherein the delivery control circuit is further configured to:
 identify that the first customer has crossed a third geo-location boundary associated with the first customer; and
 automatically re-schedule the suspended delivery of the one or more products to the delivery site in response to identifying that the first customer has crossed the third geo-location boundary.

7. The system of claim 1, wherein the delivery control circuit is further configured to automatically adjust the second geo-location boundary as a function of at least a first product of the one or more products of the scheduled delivery.

8. The system of claim 1, wherein the delivery control circuit is further configured to:
 identify that a second customer has traveled beyond the second geo-location boundary associated with the first customer, wherein the second customer is associated with the first customer; and
 wherein the automatically suspending the scheduled delivery of the one or more products is implemented in response to identifying that both the first customer and the second customer have traveled beyond the second geo-location boundary.

9. The system of claim 1, wherein the delivery control circuit in causing the suspension of the scheduled delivery is further configured to wirelessly communicate to a remote central delivery distribution system a request that the scheduled delivery be suspended.

10. A method of providing control over product deliveries to customers of a shopping facility, comprising:
 receiving, at a geo-location boundary defining system, multiple location information notifications over one or more periods of time from a mobile first customer interface unit associated with the first customer, wherein the one or more periods of time comprises at least multiple days;
 identifying, over time based on past movements of the first customer interface unit, patterns of travel by the first customer over the one or more periods of time; and
 determining, with respect to the first customer interface unit and relative to a scheduled delivery, a set of multiple geo-location boundaries comprising a first geo-location boundary corresponding to a first geographic area defined based on the patterns of travel and in accordance with statistical distances from a delivery site that the first customer interface unit travels, and a second geo-location boundary based on the patterns of travel, such that the first geo-location boundary and the second geo-location boundary are both defined prior to currently monitoring movement of the first customer interface unit based on the scheduled delivery at the delivery site and the first and second geo-location boundaries are used during a current evaluation relative to the scheduled delivery based on current movements of the first customer user interface;
 by a control circuit of a product delivery control system:
 initiating a current monitoring of locations of the first customer interface unit based on a scheduled delivery at the delivery site;
 identifying that a first customer has traveled beyond the first geo-location boundary associated with the first customer;
 triggering, in response to identifying that the first customer has traveled beyond the first geo-location boundary, a change in monitoring activity of movements of the first customer;
 identifying that the first customer has traveled beyond the second geo-location boundary associated with the first customer; and
 automatically suspending a scheduled delivery of one or more products to a delivery site in response to identifying that the first customer has traveled beyond the second geo-location boundary.

11. The method of claim 10, further comprising:

triggering, in response to identifying that the first customer has traveled beyond the first geo-location boundary, a confirmation query requesting the first customer confirm that a scheduled delivery of one or more products to a delivery site is to be suspended.

12. The method of claim 11, wherein the triggering the confirmation query further comprises:

predicting that it is safe for the first customer to receive the confirmation query; and causing a communication of the confirmation query in response to predicting that it is safe for the first customer to receive the confirmation query.

13. The method of claim 10, wherein the triggering the change in monitoring activity further comprises determining whether a detected movement pattern of the first customer is similar to a previous movement pattern of the first customer detected in the past.

14. The method of claim 10, further comprising:

determining the second geo-location boundary corresponding to distances that are within a travel time threshold from the delivery site and based on an identify threshold likelihood that the first customer will not return to the delivery site within a first threshold time of the first customer crossing the second geo-location boundary.

15. The method of claim 10, further comprising:

identifying that the first customer has crossed a third geo-location boundary associated with the first customer; and automatically re-scheduling the suspended delivery of the one or more products to the delivery site in response to identifying that the first customer has crossed the third geo-location boundary.

16. The method of claim 10, further comprising:

automatically adjusting the second geo-location boundary as a function of at least a first product of the one or more products of the scheduled delivery.

17. The method of claim 10, further comprising:

identifying that a second customer has traveled beyond the second geo-location boundary associated with the first customer, wherein the second customer is associated with the first customer; and wherein the automatically suspending the scheduled delivery of the one or more products comprises implementing the automatically suspending the scheduled delivery in response to identifying that both the first customer and the second customer have traveled beyond the second geo-location boundary.

18. The method of claim 10, wherein the suspending the scheduled delivery further comprises wirelessly communicating, from a customer interface unit associated with the first customer, to a remote central delivery distribution system a request that the scheduled delivery be suspended.

19. The system of claim 1, wherein the geo-location boundary defining system in determining the first geo-location boundary associates the first geo-location boundary with a first day of the week based on the patterns of travel corresponding to the first day of the week, and is further configured to determine, with respect to the first customer interface unit, a third geo-location boundary corresponding to an additional geographic area defined in accordance with statistical distances from the delivery site, and associate the third geo-location boundary to a second day of the week based on the patterns of travel associated with the second day of the week.

20. The system of claim 1, wherein the geo-location boundary defining system, in determining the first geo-location boundary, is configured to exclude one or more atypical distances of movement of the customer interface unit from the delivery site.

* * * * *